（12）United States Patent
Harkleroad et al.

(10) Patent No.: US 11,541,791 B2
(45) Date of Patent: Jan. 3, 2023

(54) SEAT ASSEMBLIES HAVING RESETTABLE ARMRESTS

(71) Applicant: Toyota Motor Engineering & Manufacturing North America, Inc., Plano, TX (US)

(72) Inventors: John D. Harkleroad, Ypsilanti, MI (US); Manish Shah, Canton, MI (US); Patrick J. Edgar, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 56 days.

(21) Appl. No.: 17/319,405

(22) Filed: May 13, 2021

(65) Prior Publication Data

US 2022/0363174 A1 Nov. 17, 2022

(51) Int. Cl.
*B60N 2/75* (2018.01)
(52) U.S. Cl.
CPC .................................. *B60N 2/767* (2018.02)

(58) Field of Classification Search
CPC ................................ A47C 7/541; B60N 2/767
See application file for complete search history.

(56) References Cited

U.S. PATENT DOCUMENTS 7,934,771 B2 5/2011 Tamakoshi et al.
9,573,497 B2 2/2017 Jaradi et al.

FOREIGN PATENT DOCUMENTS

CN 206781578 U 12/2017
CN 210714213 U 6/2020
CN 211130369 U 7/2020

*Primary Examiner* — Philip F Gabler
(74) *Attorney, Agent, or Firm* — Dinsmore & Shohl LLP

(57) ABSTRACT

A seat assembly including a seat frame, an armrest pivotally coupled to the seat frame, a stopper, and an engagement member. The armrest pivots between a use position and a drop down position below the use position in a vertical direction. In the use position, the armrest is configured to support an arm of a user. The engagement member contacts the stopper in the use position to inhibit movement of the armrest from the use position toward the drop down position. The engagement member is configured to deform against the stopper upon application of a predetermined force to allow the armrest to move from the use position toward the drop down position.

12 Claims, 5 Drawing Sheets

SEAT ASSEMBLIES HAVING RESETTABLE ARMRESTS

TECHNICAL FIELD

The present specification generally relates to seat assemblies and, more specifically, seat assemblies having armrests that are resettable from a drop down position to a horizontal use position after receiving a load exceeding a predetermined threshold.

BACKGROUND

Traditional seat armrests, such as in a vehicle, may support an occupant's arm in a use position. However, the traditional seat armrests include structural components that may break when a threshold load on the armrest is exceeded. Upon exceeding the threshold load and breakage of the structural components, the armrest would need to be replaced for the armrest to support the occupant's arm in the use position.

Accordingly, a need exists for armrests that may be reset after a threshold weight on the armrest is exceeded.

SUMMARY

A seat assembly including a seat frame, an armrest pivotally coupled to the seat frame, a stopper, and an engagement member. The armrest pivots between a use position and a drop down position below the use position in a vertical direction. In the use position, the armrest is configured to support an arm of a user. The engagement member contacts the stopper in the use position to inhibit movement of the armrest from the use position toward the drop down position. The engagement member is configured to deform against the stopper upon application of a predetermined force to allow the armrest to move from the use position toward the drop down position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
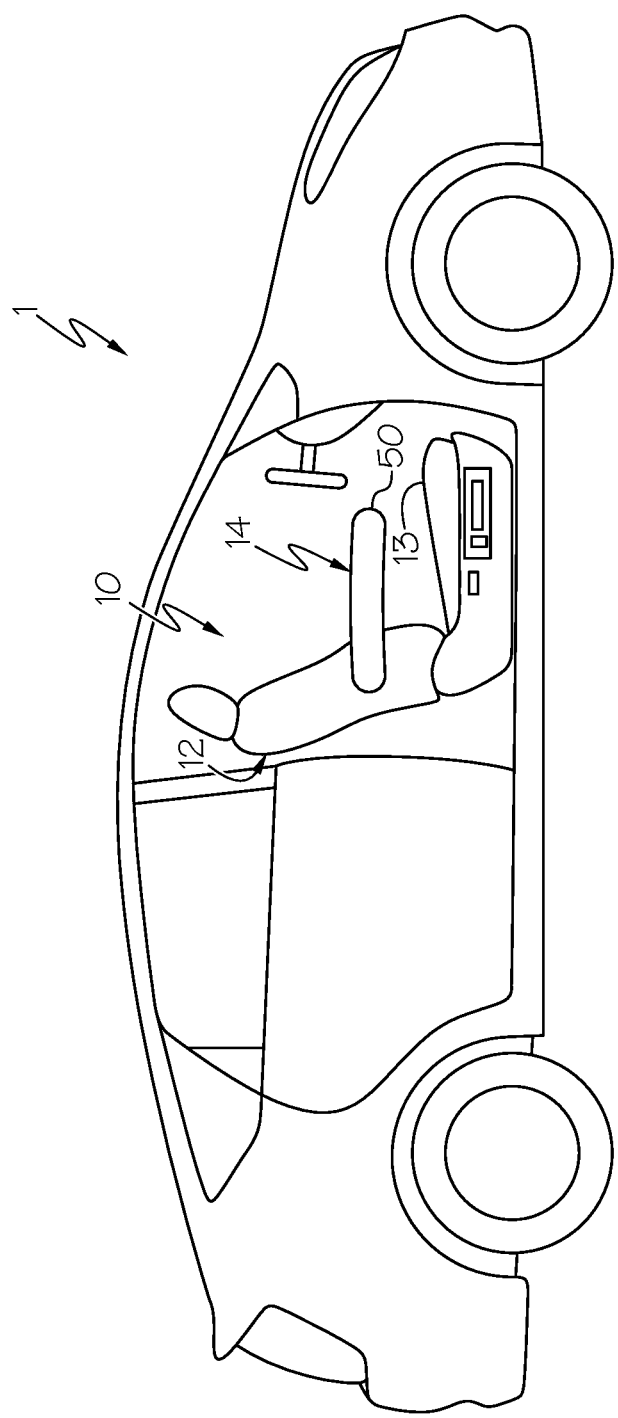
FIG. 1A schematically depicts a side view of a vehicle including a seat assembly with a resettable armrest in a horizontal use position, according to one or more embodiments shown and described herein.

Embodiments described herein are directed to a seat assembly including a seat frame, and an armrest pivotally coupled to the seat frame. The armrest may pivot from a horizontal use position to a drop down position below the horizontal use position in a vehicle vertical direction upon application of a load on the armrest. The armrest may additionally be reset to the horizontal use position after receiving the load by being pivoted to a reset position positioned above the horizontal use position in the vehicle vertical direction. Various embodiments of the resettable armrest and the operation of the resettable armrest are described in more detail herein. Whenever possible, the same reference numerals will be used throughout the drawings to refer to the same or like parts.

As used herein, the term "vehicle longitudinal direction" refers to the forward-rearward direction of the vehicle. The forward direction is a direction in which a user is facing when seated in the vehicle. The term "vehicle lateral direction" refers to the cross-direction or vehicle width direction, and is transverse to the vehicle longitudinal direction. The term "vehicle vertical direction" refers to the upward-downward direction of the vehicle.

Referring now to FIG. 1A, a vehicle 1 including a seat assembly 10 is illustrated according to one or more embodiments described herein. As depicted, the seat assembly 10 is a driver's seat for a vehicle. However, the seat assembly 10 may be a passenger seat for a vehicle. The vehicle may be a van, truck, sedan, sport utility vehicle (SUV), boat, train, airplane, or the like. It should be understood that in other embodiments, the seat assembly 10 may be a front seat, a second row seat, or a third row seat. Further, it should be understood that the seat assembly 10 may be a "50/50" seat, a "60/40" seat, a captain type seat, a bucket type seat, a bench type seat, or other various seat assembly. It is also appreciated that the seat assembly 10 may be a stand alone seat assembly, such as a furniture type seat, or a seat assembly provide in a facility such as a movie theater or bus station.

The seat assembly 10 may include a seat frame 12, a seat cushion 13, and a resettable armrest 14. The resettable armrest 14 may be pivotally coupled to the seat frame 12 to pivot from a horizontal use position, as shown in FIG. 1A. In the horizontal use position, the resettable armrest 14 is used to support an occupant's arm. In the horizontal use position, a distal end 50 of the armrest 14 may be positioned in a vehicle vertical direction from the seat cushion 13. In the horizontal use position, the armrest 14 extends horizontally such that a longitudinal direction of the armrest 14 extends parallel to one of the vehicle longitudinal direction or the vehicle width direction.

Figure 1B:
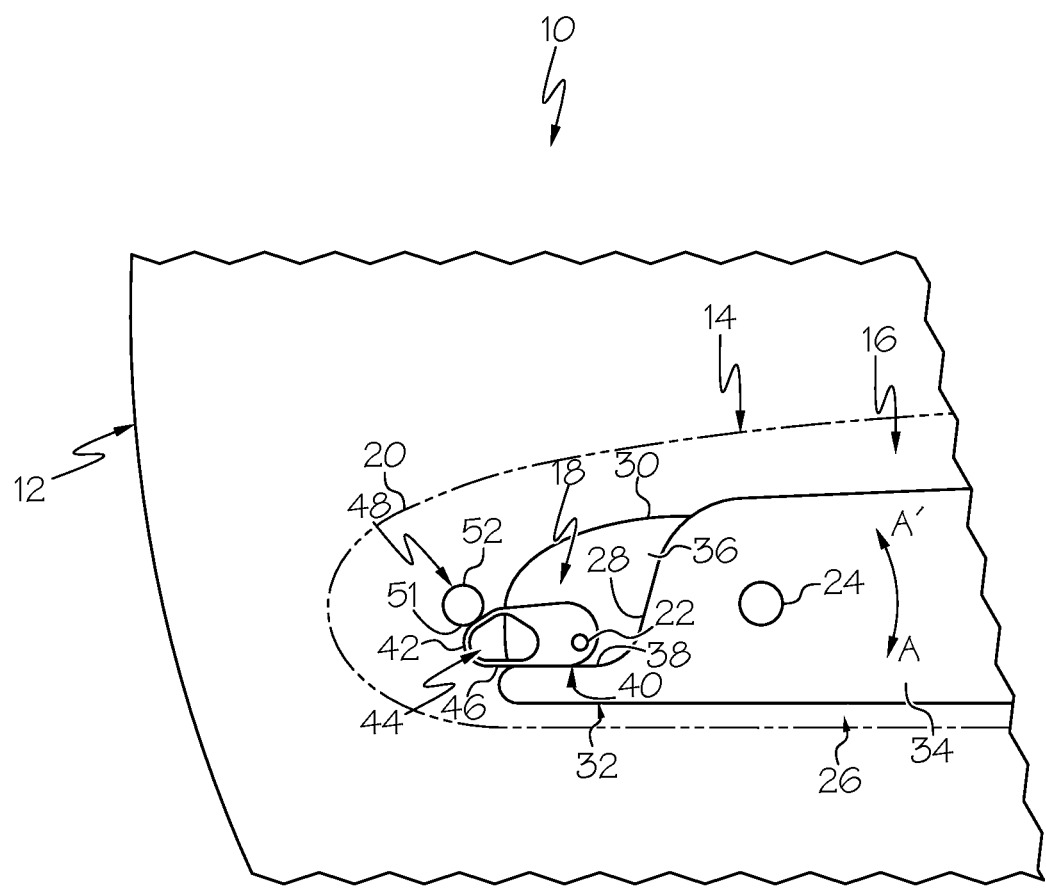
FIG. 1B schematically depicts a partial side view of the resettable armrest in the horizontal use position, the resettable armrest including an engagement member, according to one or more embodiments shown and described herein.

Referring now to FIG. 1B, a partial side view of the resettable armrest 14 is depicted, with the resettable armrest 14 in the horizontal use position and a cover 20 of the resettable armrest 14 shown in phantom. The resettable armrest 14 may include a frame 16, an engagement member 18, the cover 20, and a stopper 48. The frame 16 is pivotally coupled to the seat frame 12 by a second pin 24. The engagement member 18 is pivotally coupled to the frame 16 by a first pin 22. The cover 20 may extend over, and enclose the frame 16, engagement member 18, and stopper 48.

The frame 16 may include a main body 26 with a rear wall 28, a side wall 30 extending rearward in the vehicle longitudinal direction from the rear wall 28 of the main body 26, and a tab 32 extending rearward in the vehicle longitudinal direction from the rear wall 28 of the main body 26. The main body 26 may include a side surface 34 positioned in a vehicle lateral direction from the side wall 30. The side wall 30 may be offset from a center of the armrest frame 16, such that the rear wall 28 defines a step between the side wall 30 and the side surface 34. The side wall 30 may include a mounting surface 36. The tab 32 may include a contact surface 38. The armrest frame 16 may be made of, for example, but not limited to, aluminum, steel, plastic, PVC, resin, or the like.

The engagement member 18 may include a cam body 40. The cam body 40 may include a cam surface 42, a bore 44 extending at least partially through the cam body 40 near the cam surface 42, and a bottom surface 46. In some embodiments, the cam surface 42 may be concentric with the circumference of the bore 44, such that the thickness of the cam body 40 around the bore 44 is uniform. The bore 44 is configured to increase the elasticity of the engagement member 18 at the cam surface 42, thereby decreasing the amount of force required to elastically deform the cam body 40. The bore 44 may be decreased in size to decrease the elasticity of the cam body 40. The bore 44 may alternatively be increased in size to increase the elasticity of the cam body 40. The engagement member 18 may be made of a material that elastically deforms, such as, resin, plastic, rubber, or the like. In embodiments, the engagement member 18 is a resilient member that deforms. In embodiments, the engagement member 18 does not deform. In embodiments, the engagement member 18 is a spring that deforms.

The cam body 40 is configured to elastically deform between a rebound state and a deformed state. In the rebound state, the cam body 40 maintains its original shape, as shown in FIG. 1B. In the deformed state, the cam body 40 is elastically deformed, as will be discussed in greater detail below.

The first pin 22 may extend through the cam body 40 of the engagement member 18 and the mounting surface 36 of the side wall 30 so as to pivotally couple the engagement member 18 to the side wall 30 of the frame 16. The engagement member 18 may pivot about the first pin 22 between a support position, as shown in FIG. 1B, and a rotated position, as shown in FIG. 3B. In the support position, the bottom surface 46 of the engagement member 18 contacts the contact surface 38 of the tab 32. The engagement member 18 is configured to support the frame 16 in the horizontal use position. In the rotated position, the engagement member 18 is pivoted away from the tab 32 such that the bottom surface 46 is spaced apart from the contact surface 38 of the tab 32. The second pin 24 may extend through the side surface 34 of the main body 26 and the seat frame 12, pivotally coupling the resettable armrest 14 to the seat frame 12. The second pin 24 may be positioned forward of the engagement member 18 in the vehicle longitudinal direction.

The stopper 48 may be fixedly secured to the seat frame 12. The stopper 48 may include a lower surface 51 and an upper surface 52 positioned above the lower surface 51 in the vehicle vertical direction. The stopper 48 may extend in the vehicle width direction from the seat frame 12, such that the stopper 48 is within a path of travel of the engagement member 18. The stopper 48 may be an elongated, cylindrical body, that includes a circular profile when viewed in the vehicle width direction. The stopper 48 may be positioned adjacent the armrest 14, such that the cover 20 extends over the stopper 48. The stopper 48 may be positioned rearward of the engagement member 18 in the vehicle longitudinal direction. The stopper 48 may be made of, for example, but not limited to, aluminum, steel, plastic, PVC, resin, or the like.

Referring to FIGS. 1A and 1B, the seat assembly 10 is in a use state. In the use state, the armrest 14 is in the horizontal use position, and the engagement member 18 is in the support position. In the support position, the engagement member 18 is positioned between the tab 32 and the stopper 48. The cam surface 42 of the engagement member 18 contacts the lower surface 51 of the stopper 48 with the engagement member 18 in the support position. In the support position, the bottom surface 46 of the engagement member 18 contacts the contact surface 38 of the tab 32. The tab 32 supports the bottom surface 46 of the engagement member 18 such that rotation of the armrest 14 in the A direction rotates the engagement member 18 with the armrest 14. In the horizontal use position, the rotation of the armrest 14 is inhibited by the contact between the cam surface 42 of the engagement member 18 and the stopper 48. Moreover, in the support position, the armrest 14 may pivot in the A' direction without inhibition from the engagement member 18.

The engagement member 18 is configured to deform against the stopper 48 upon application of a load on or along the armrest 14 that exceeds a preset threshold load. In some embodiments, the threshold load is 300 pounds (lbs) ±10%, ±20%, or ±30%, ±40%, or ±50%. However, it is appreciated that the threshold load is not limited to the above defined thresholds and may include threshold loads of 50 lbs, 100 lbs or 400 lbs ±10%, ±20%, or ±30%, ±40%, or ±50%.

Figure 2A:
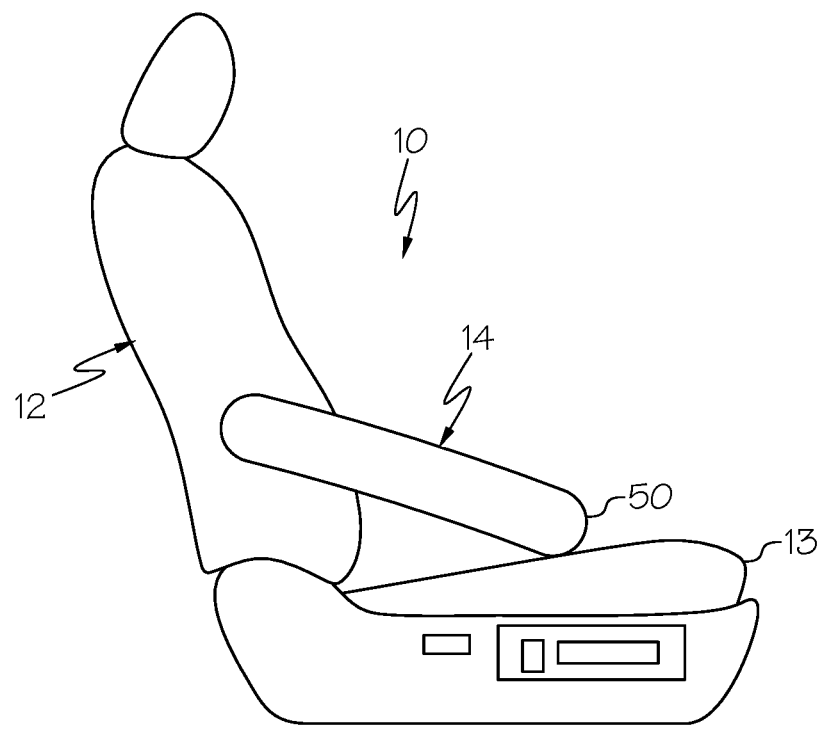
FIG. 2A schematically depicts a side view of the seat assembly with the resettable armrest in a drop down position, according to one or more embodiments shown and described herein.

Referring now to FIG. 2A, the seat assembly 10 is depicted in a drop down state. In the drop down state, the armrest 14 is in a drop down position, and the engagement member 18 is in a passed position. In the drop down position, the distal end 50 of the armrest 14 may be positioned below the distal end 50 of the armrest 14 in the horizontal use position. The distal end 50 of the armrest 14 may contact the seat cushion 13 of the seat assembly 10, where the seat cushion 13 supports the distal end 50 of the armrest 14. The armrest 14 moves from the use position to the drop down position upon application of a load on the armrest 14 that exceeds the threshold load so as to sequentially move the engagement member 18 from the support position to the deformed position and from the deformed position to the passed position. In the passed position, the engagement member 18 has passed over the stopper 48 such that the bottom surface 46 is in contact with the contact surface 38 and the bottom surface 46 contacts an upper surface 52 of the stopper 48.

Figure 2B:
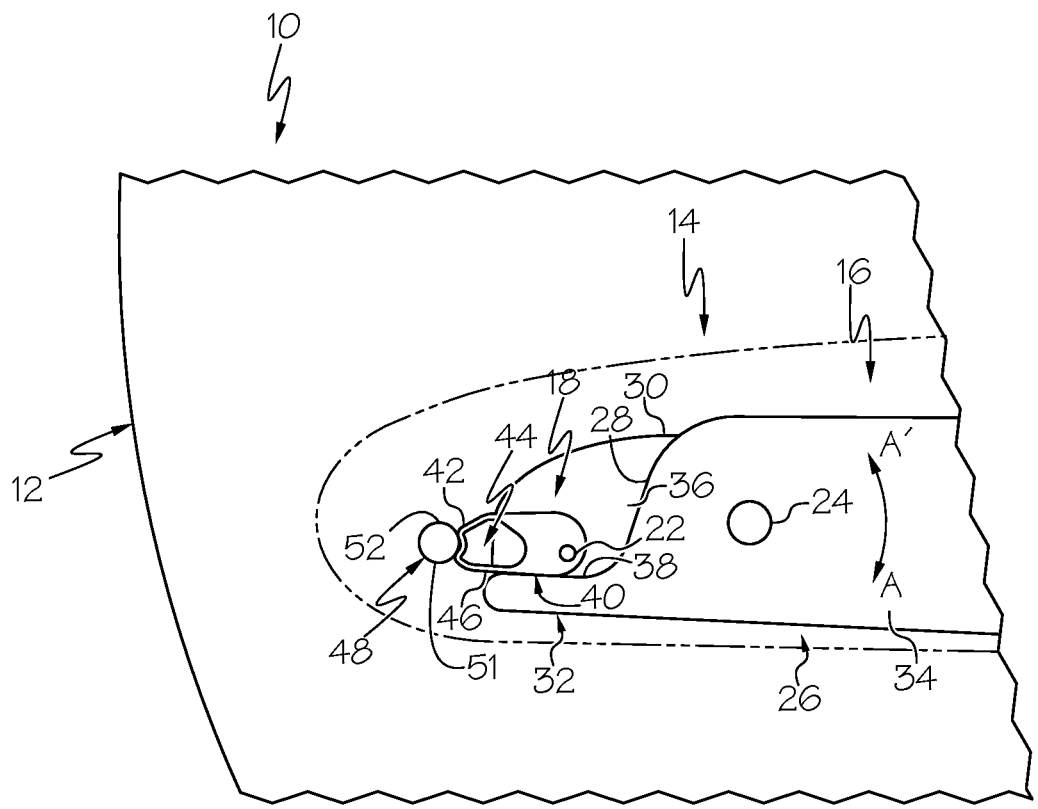
FIG. 2B schematically depicts a partial side view of the resettable armrest with the engagement member in a deformed state, according to one or more embodiments shown and described herein.

Referring now to FIG. 2B, the resettable armrest 14 is depicted in an intermediate position between the drop down position and the reset position, with the engagement member 18 in the deformed position which is an intermediate position between the support position and the passed position. In the deformed position, the engagement member 18 is deformed against the stopper 48 into the deformed state. In some embodiments, the cam surface 42 is deformed such that the cam surface 42 may partially extend into the bore 44. In some embodiments, the bottom surface 46 of the engagement member 18 maintains contact with the contact surface 38 in the deformed position.

Figure 2C:
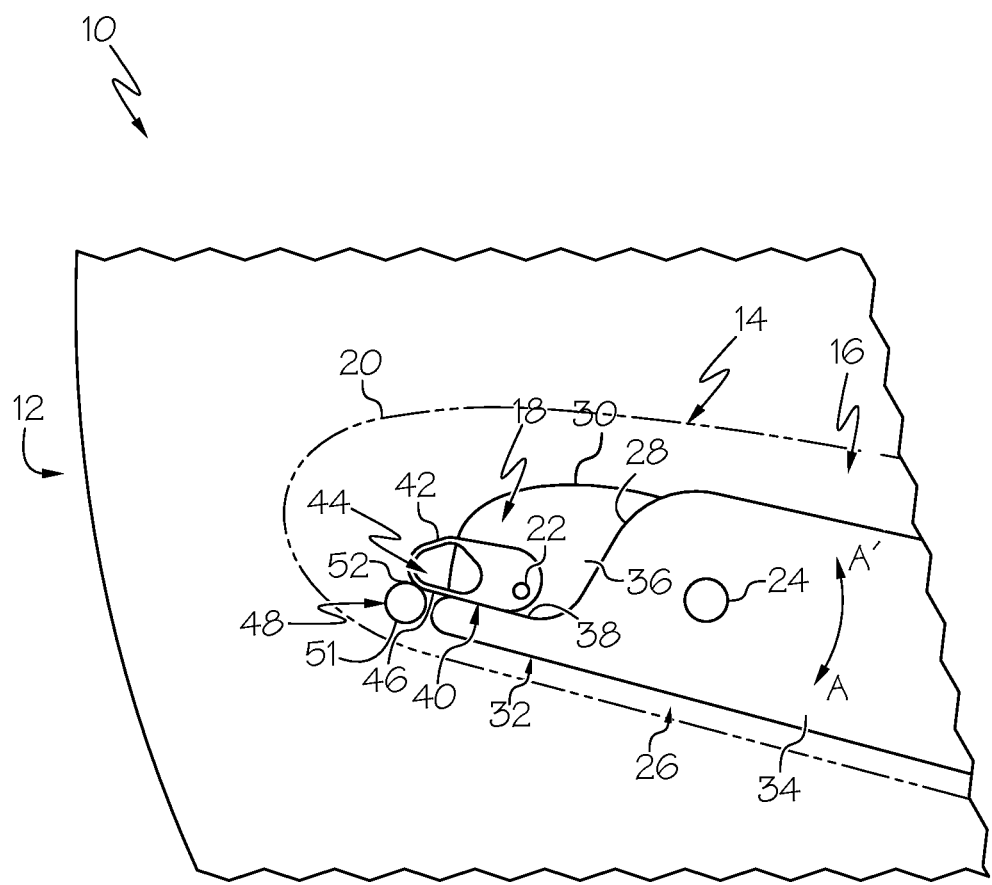
FIG. 2C schematically depicts a partial side view of the resettable armrest in the drop down position, according to one or more embodiments shown and described herein.

Referring now to FIG. 2C, the resettable armrest 14 is depicted in the drop down position, with the cover 20 shown in phantom, and the engagement member 18 is in the passed position. In the drop down position, the distal end 50 is pivoted downward from the horizontal use position. In the drop down position, the tab 32 is rotated upward from the horizontal use position, where the engagement member 18 is positioned above the stopper 48 in the assembly vertical direction. The cam surface 42 may contact the upper surface 52 of the stopper 48.

When moving from the use position to the drop down position, the distal end 50 of the armrest 14 is pivoted downward in the vehicle vertical direction, and the tab 32 is rotated upward, opposite the direction of the distal end 50 as the axis of rotation of the armrest 14 is positioned between the tab 32 and the distal end 50. The movement of the tab 32 moves the engagement member 18 upward into the stopper 48. The contact between the engagement member 18 and the stopper 48 moves the engagement member 18 into the deformed position. In the deformed position, the engagement member 18 allows the armrest 14 to rotate passed the stopper 48 such that the engagement member 18 is in the passed position and the armrest 14 is in the drop down position.

Figure 3A:
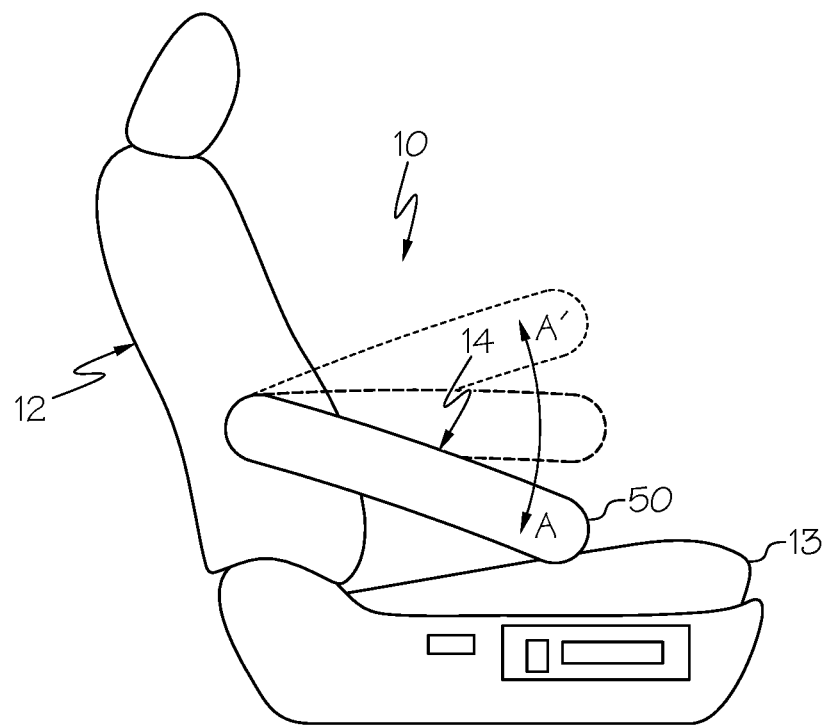
FIG. 3A schematically depicts a side view of the seat assembly with a reset process for resetting the resettable armrest from the drop down position to the horizontal use position shown in phantom, according to one or more embodiments shown and described herein.
Figure 3B:
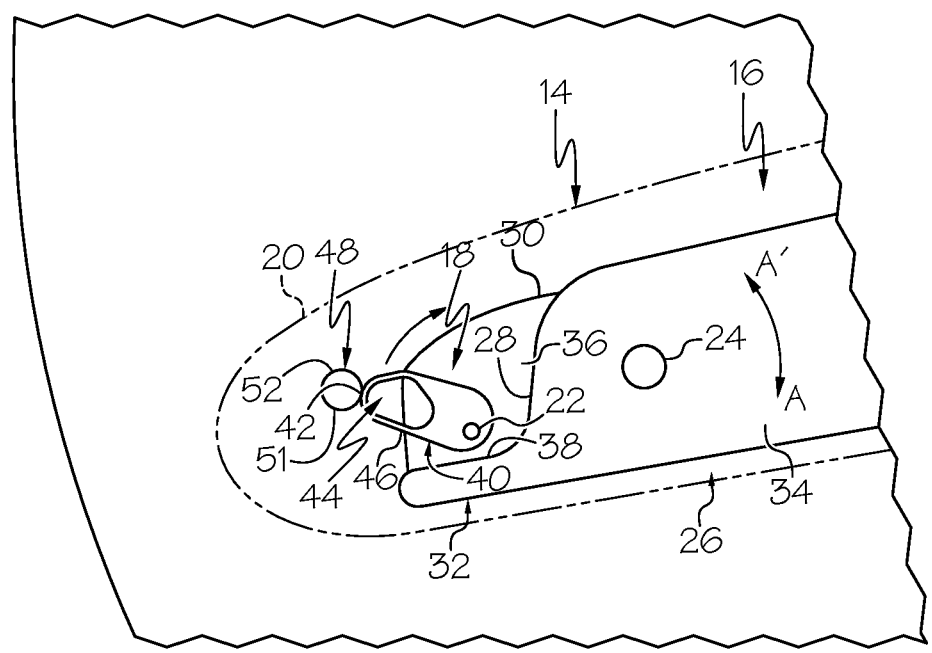
FIG. 3B schematically depicts a partial side view of the resettable armrest with the engagement member in a reset position, according to one or more embodiments shown and described herein.

Referring now to FIG. 3A, the seat assembly 10 is shown with the reset process of the resettable armrest 14. The seat assembly 10 includes a reset state. In the reset state, the armrest 14 is in a reset position and the engagement member 18 is in the rotated position. The resettable armrest 14 is shown in the drop down position, with the horizontal use position and the reset position shown in phantom. The armrest 14 may be rotated in the A' direction from the drop down position to the reset position. The distal end 50 of the armrest 14 in the reset position may be positioned above the distal end 50 of the armrest 14 in the horizontal use position. Once the armrest 14 reaches the reset position, the armrest 14 may be rotated in the A direction, so that the armrest 14 can return to the horizontal use position.

Referring now to FIG. 3B, the resettable armrest 14 is shown in the reset position with the cover 20 shown in phantom. In the reset position, the engagement member 18 is rotated about the first pin 22 upward from the passed position, shown in FIG. 2C, away from the tab 32, to the rotated position. In the rotated position, the engagement member 18 is spaced apart from the tab 32, as shown in FIG. 3B. Upon continued movement of the armrest 14 from the drop down position towards the reset position, the engagement member 18 moves from the passed position towards the rotated position and into the support position. In the rotated position, the engagement member 18 may pass from above the stopper 48 to below the stopper 48.

When moving from the drop down position to the reset position, the armrest 14 rotates in the A' direction. The rotation of the armrest 14 in the A' direction pivots the engagement member 18 from the passed position, as shown in FIG. 2C, to the rotated positon, as shown in FIG. 3B, and into the support position, as shown in FIG. 1B, such that the bottom surface 46 of the engagement member 18 contacts the contact surface 38 of the tab 32. The movement of the armrest 14 from the drop down position to the reset position moves the engagement member 18 from the passed positon through the rotated position and back into the support position.

The operation of the resettable armrest 14 will now be described with reference to FIGS. 1A-3B. The armrest 14 may initially be in the use position. A load may be applied to the armrest 14 in the horizontal use position. When the load applied exceeds the predetermined threshold load, the distal end 50 of the armrest 14 rotates downward in the direction of arrow A toward the drop down position, elastically deforming the engagement member 18 against the stopper 48 into the deformed position. The elastic deformation of the engagement member 18 allows the armrest 14 to pivot passed the stopper 48 into the passed position and the armrest 14 into the drop down position. In some embodiments, the distal end 50 of the armrest 14 is supported by the seat cushion 13 in the drop down position. The movement of the armrest 14 from the use position to the drop down position moves the engagement member 18 from the support position to the deformed position and from the deformed position to the passed position. The armrest 14 may be pivoted upward in the A' direction. If the armrest 14 is pivoted to a position lower than the reset position, the armrest 14 may pivot downwards passed the horizontal use position to the drop down position.

The armrest 14 may be pivoted from the drop down position to the reset position in the A' direction, with the distal end 50 moving in the vehicle vertical direction. The movement of the armrest 14 from the drop down position to the reset position moves the engagement member 18 from the passed position to the rotated position and from the rotated position to the support position. Upon movement from the drop down position to the reset position, the engagement member 18 moves from the passed position to the rotated position due to the contact of the upper surface 52 of the stopper 48 with the bottom surface 46 of the engagement member 18 which pivots the engagement member 18 upwards from the passed position to the rotated position with the rotation of the armrest 14 in the A' direction.

When in the reset position, the engagement member 18 is in the support position, with the engagement member 18 positioned below the stopper 48 in the vehicle vertical direction and the bottom surface 46 of the engagement member 18 contacting the contact surface 38 of the armrest 14. The armrest 14 may be pivoted from the reset position to the horizontal use position while the engagement member 18 is maintained in the support position through contact with the lower surface 51 of the stopper 48. In the support position and the horizontal use position, the armrest 14 may again be used to support an arm of a user. Once the armrest 14 returns to the horizontal use position after the reset position, the armrest 14 is maintained in the horizontal use position until receiving a load exceeding the threshold load.

From the above, it is to be appreciated that defined herein is a seat assembly including a seat frame, and an armrest pivotally coupled to the seat frame, where the armrest may pivot from a horizontal use position to a drop down position below the horizontal use position in a vehicle vertical direction upon application of a load on the armrest. The armrest may additionally be reset to the horizontal use position after receiving the load by being pivoted to a reset position positioned above the horizontal use position in the vehicle vertical direction.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A seat assembly comprising:
a seat frame;
an armrest pivotally coupled to the seat frame between a use position and a drop down position below the use position in a vertical direction, in the use position the armrest is configured to support an arm of a user;
a stopper; and
an engagement member that contacts the stopper in the use position to inhibit movement of the armrest from the use position toward the drop down position, the engagement member is configured to deform against the stopper upon application of a predetermined force to allow the armrest to move from the use position toward the drop down position.

2. The seat assembly of claim 1, wherein:
the engagement member is pivotally coupled to the armrest;
the armrest is configured to pivot to a reset position above the use position in the vertical direction; and
the engagement member pivots past the stopper when the armrest moves from the drop down position to the reset position to allow the armrest to move to the use position.

3. The seat assembly of claim 2, wherein the armrest comprises:
a frame; and
a tab extending from the frame,
the frame of the armrest is pivotally coupled to the seat frame,
the engagement member is pivotally coupled to the frame of the armrest, and
the engagement member is supported by the tab of the armrest in the use position.

4. The seat assembly of claim 3, wherein:
in the use position, the engagement member is positioned between and contacts the tab and the stopper, the engagement member supporting the armrest against the stopper, and
a cam surface of the engagement member contacts a lower surface of the stopper in the vertical direction.

5. The seat assembly of claim 4, wherein:
in the drop down position, the engagement member is positioned above the stopper, and
the cam surface contacts an upper surface of the stopper in the vertical direction.

6. The seat assembly of claim 5, wherein:
the engagement member comprises a bore extending therethrough.

7. The seat assembly of claim 6, wherein the cam surface is deformed toward the bore when the engagement member is deformed against the stopper.

8. The seat assembly of claim 7, wherein the contact between the upper surface of the stopper and the engagement member pivots the engagement member upward when the armrest moves from the drop down position to the reset position, such that the engagement member passes below the stopper in the reset position.

9. The seat assembly of claim 8, wherein the stopper is positioned in a rear direction of the engagement member.

10. The seat assembly of claim 8, wherein the stopper is fixedly secured to the seat frame.

11. The seat assembly of claim 1, wherein the seat assembly is provided within a vehicle.

12. The seat assembly of claim 1, wherein the armrest is configured to be maintained in the use position after being pivoted upward in the vertical direction from the drop down position.

* * * * *